(12) United States Patent
Nelson

(10) Patent No.: US 6,286,963 B1
(45) Date of Patent: Sep. 11, 2001

(54) TELESCOPE QUICK CONNECT AND DISCONNECT DEVICE FOR ACCESSORIES

(76) Inventor: Kendall Nelson, 1219 Loop Rd., Clayton, NC (US) 27520

( * ) Notice: Subject to any disclaimer, the term of this patent is extended or adjusted under 35 U.S.C. 154(b) by 0 days.

(21) Appl. No.: 09/542,483

(22) Filed: Apr. 3, 2000

Related U.S. Application Data

(60) Provisional application No. 60/127,723, filed on Apr. 5, 1999.

(51) Int. Cl.[7] .............................. G02B 7/00; G02B 23/00; G02B 23/08
(52) U.S. Cl. ......................... 359/506; 359/399; 359/405; 359/503; 359/828
(58) Field of Search .................................... 359/503–506, 359/362–363, 399, 405, 407, 409, 480–482, 423, 431, 434–435, 831–837, 819, 827, 894, 828; 348/75, 79; 396/429–433

(56) References Cited

U.S. PATENT DOCUMENTS

| | | | |
|---|---|---|---|
| 3,831,862 | * 8/1974 | Calder ................................. | 239/526 |
| 4,600,277 | * 7/1986 | Murray, Jr. .......................... | 359/423 |
| 4,695,702 | * 9/1987 | Gartland ........................... | 219/137.63 |
| 4,807,594 | * 2/1989 | Chatenever ......................... | 359/894 |
| 5,054,886 | * 10/1991 | Ozaki et al. ........................ | 359/819 |
| 5,959,770 | * 9/1999 | Perkins et al. ....................... | 359/422 |

* cited by examiner

*Primary Examiner*—Thong Nguyen
(74) *Attorney, Agent, or Firm*—Mills Law Firm PLLC

(57) ABSTRACT

Telescopes have many accessories including astrophotography devices. A finely threaded accessory ring of conventional diameter is provided on these telescopes with the accessories being screwed thereinto with the constant danger of cross-threading. The present invention is threaded into the accessory ring of the telescope and on to the mating threads of the accessories. Through the use of the adapter of the present invention, the male adapter includes an outwardly projecting locking pin and the female adapter includes a mating, generally L-shaped locking slot to allow slide-on and twist locking and twist and slide-off unlocking. This can be accomplished in one to two seconds versus ten to twelve seconds to install and seven to eight seconds to remove accessories using the conventional thread-on, thread-off method.

3 Claims, 3 Drawing Sheets

TELESCOPE QUICK CONNECT AND DISCONNECT DEVICE FOR ACCESSORIES

This application claims benefit of Prov. No. 60/127,723 filed Apr. 5, 1999.

BACKGROUND OF INVENTION

FIELD OF INVENTION

This invention relates to telescopes and, more particularly, to quick connect and disconnect means for telescope accessories.

Telescopes such as the Schmidt Cassegrain Telescopes can be used with many accessories including astrophotography devices. A fine thread accessory ring of conventional diameter is provided on these telescopes.

The conventional method of changing accessories is to unscrew the accessory to remove it and then to thread the new accessory back on the telescope accessory ring. Since this is usually done in the dark so as not to affect the night vision of the user, cross threading of the fine threads on the accessory ring is common. Once the accessory is cross threaded then the whole rear plate of the telescope must be removed and replaced.

Using the conventional method of changing accessories, the skilled astronomer still takes 10 to 12 seconds to install and 7 to 8 seconds to remove the same.

CONCISE EXPLANATION OF REFERENCES

There are no known prior art references.

BRIEF SUMMARY OF INVENTION

After much research and study into the above mentioned problems, the present invention has been developed to provide a quick connect and disconnect means for telescope accessories that is mounted the standard threaded accessory ring of the telescope. Through the use of locking pin and locking slots, the male and female adapters can be connected and disconnected in one to two seconds in the dark.

In view of the above, it is an object of the present invention to provide a means for quick connect and disconnect of accessories to and from telescopes.

Another object of the present invention is to provide a means for rapidly changing accessories on telescopes including astrophotography devices.

Another object of the present invention is to provide a means for changing accessories on telescopes while eliminating the possibility of cross threading.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
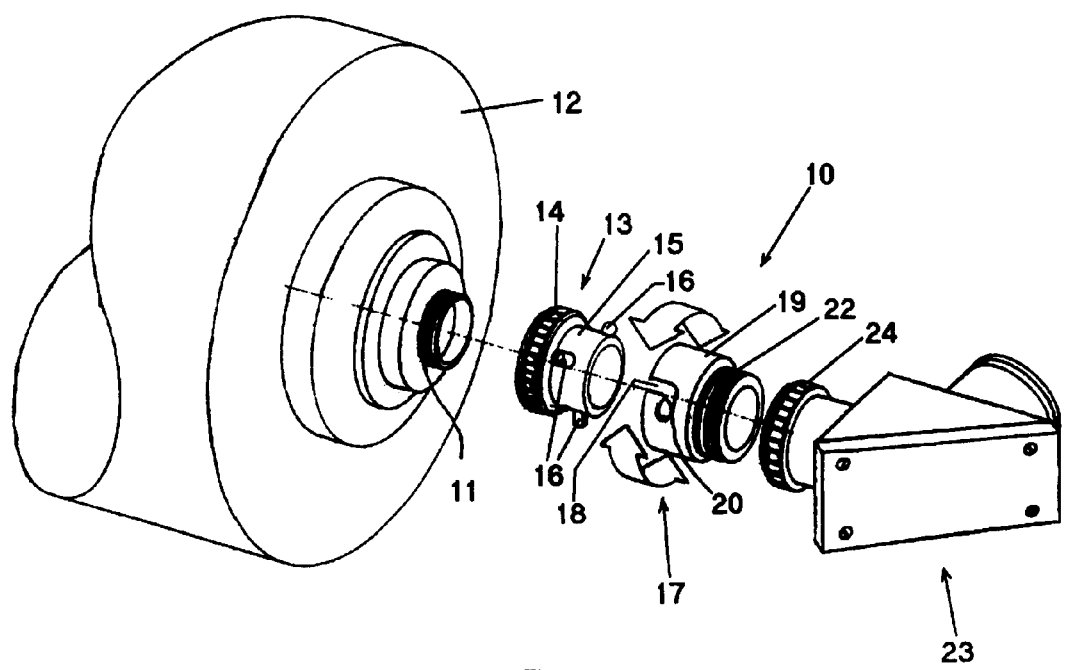
FIG. 1 is an exploded view of the telescope quick connect and disconnect device for accesories.
Figure 2:
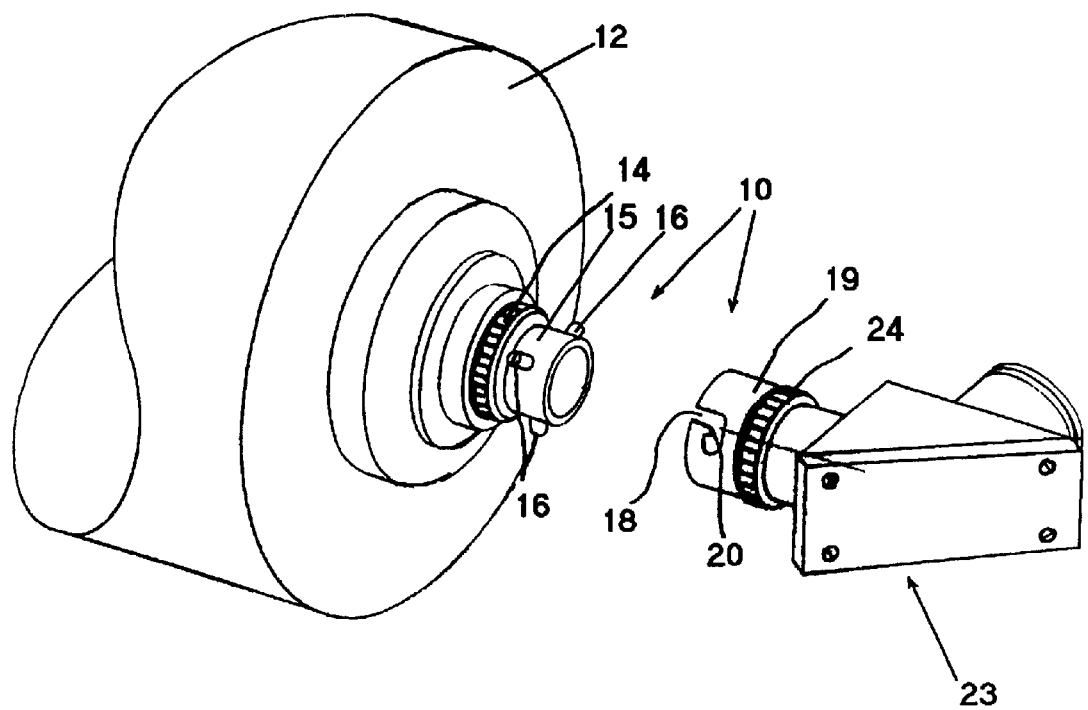
FIG. 2 shows the male adapter threaded onto the accessory ring of the telescope with the accessory in alignment therewith.
Figure 3:
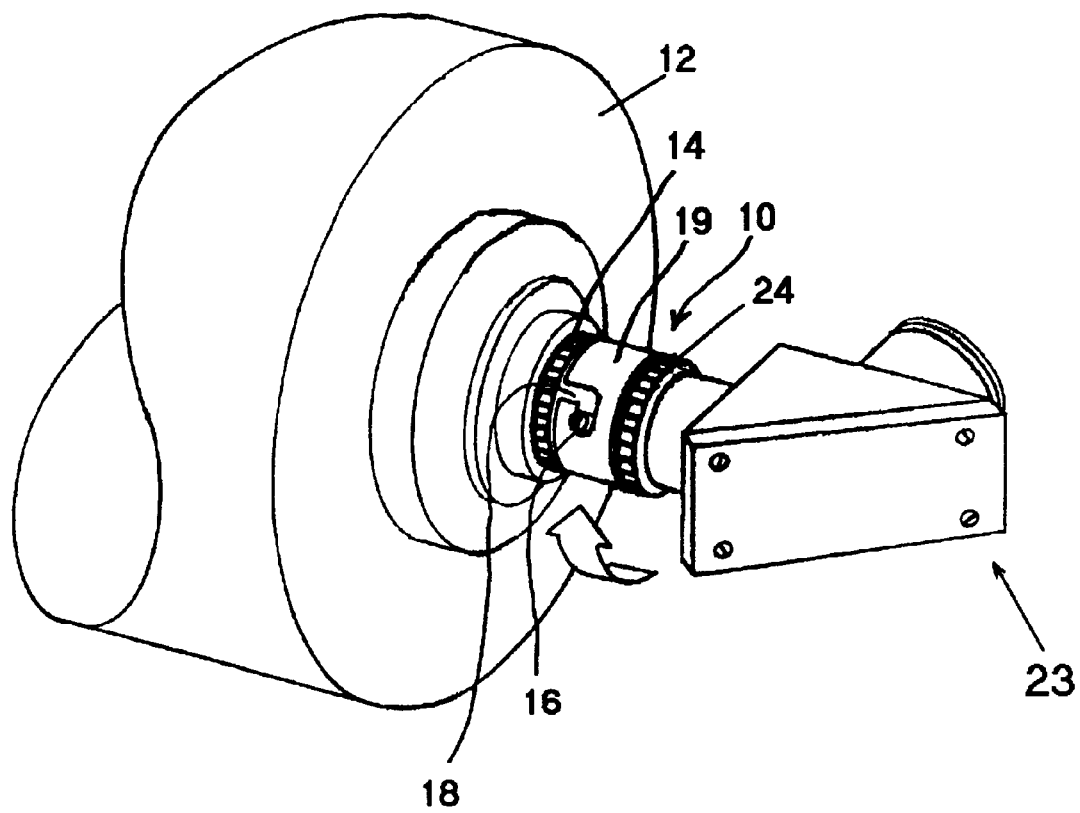
FIG. 3 is perspective view of the accessory mounted on the telescope using the quick connect and disconnect device of the present invention.

The quick connect and disconnect device of the present invention, indicated generally at 10, is adapted to be mounted on the standard threaded accessory ring 11 of telescope 12.

The quick connect and disconnect device of the present invention includes a male adapter indicated generally at 13, is internally threaded on one end for threadingly mounting on the telescope accessory ring 11.

The male adapter 13 includes a serrated grip ring 14 and a sleeve portion 15 with a plurality of locking pins 16 outwardly projecting therefrom.

A female adapter indicated generally at 17, is designed to snugly slide over the sleeve portion 15 of the male adapter 13. Generally L-shaped locking slots 18 are provided in the barrel portion 19 of the female adapter 17 and line up to receive the locking pins 16 of male adapter 13. An internal spring, not shown, can be provided to place positive pressure on the locked adapters 13 and 17.

It should be noted that there is a rounded lip 20 at the edge of the lateral portion of each of the L-shaped locking slots 18 to prevent the mated, locked male and female adapter from accidentally coming disengaged.

The end of the female adapter 17, opposite the sleeve portion 19, is threaded with the same size thread 22 as the threaded accessory ring 11 on the telescope 12.

The various accessories, indicated generally at 23, have a grip ring 24 that is internally threaded so that the female adapter 17 can be threaded thereinto.

A female adapter 17 can be threaded into all of the different accessories such as cameras, etc. that are to be used with the telescope 12 so that each of these accessories can be quickly twist locked onto the male adapter 13 mounted on the accessory ring 11 of the telescope 12. They can just as quickly be removed therefrom. Rather than the 10 to 12 seconds to install and 7 to 8 seconds to remove accessories using the conventional method, it takes only 2 seconds to install and one second to remove such accessory using the present invention.

Since the various accessories used by astronomers in not only viewing the heavens, but also in astrophotography are all well known to those skilled in the art, further detailed discussion of these items is not deemed necessary.

From the above, it can be seen that the present invention provides a telescope quick connect and disconnect device with respective male and female portions left permanently on the telescope and the various accessories used in conjunction therewith. A simple push and twist locks the male and female portions together while a simple twist and pull separates the portions.

The present invention, of course, can be carried out in other specific ways. Other objects and advantages of the present invention will become apparent and obvious from a study of the following description and the accompanying drawings which are merely illustrative of such invention.

What is claimed is:

1. A quick connect and disconnect device for removably connecting a telescope accessory characterized by a threaded mounting bore with a telescope characterized by a threaded mounting sleeve complementary to the mounting bore, said device comprising: a telescope adapter member and an accessory adapter member, said telescope adapter member having an inner end with a threaded adapter bore for connection with the mounting sleeve of the telescope and an outer end with a plurality of circumferentially spaced, radially projecting pins, said accessory adapter member having an outer end with a threaded adapter sleeve for connection with the mounting bore of the accessory and an inner end having a cylindrical sleeve receivable over the outer end of the telescope adapter member and including a plurality of L-shaped radial slots in said cylindrical sleeve having axial portions intersecting circumferential portions, said radial slots registering with said projecting pins and detatachably connectable to said telescope adapter member by axial and circumferential relative movement.

2. The device as recited in claim 1 wherein said slots have axially projecting lips at the intersection of said axial portions and said circumferential portions for preventing inadvertent disengagement between said adapter members.

3. In a telescope having a projecting threaded sleeve for connection with a telescope accessory having a complementary mounting bore, an adapter for connecting said. telescope with said accessory comprising: a first adapter member and a second adapter member, said first adapter member having an inner end with a threaded adapter bore for connection with the threaded sleeve of the telescope, said second adapter member having an outer end with a threaded adapter sleeve for connection with the mounting bore of the accessory; a plurality of circumferentially spaced, radially projecting pins on one of said adapter members; and a plurality of L-shaped radial slots on the other of said adapter members registering with said projecting pins for connecting said adapter members by relative axial and circumferential movement.

* * * * *